UNITED STATES PATENT OFFICE.

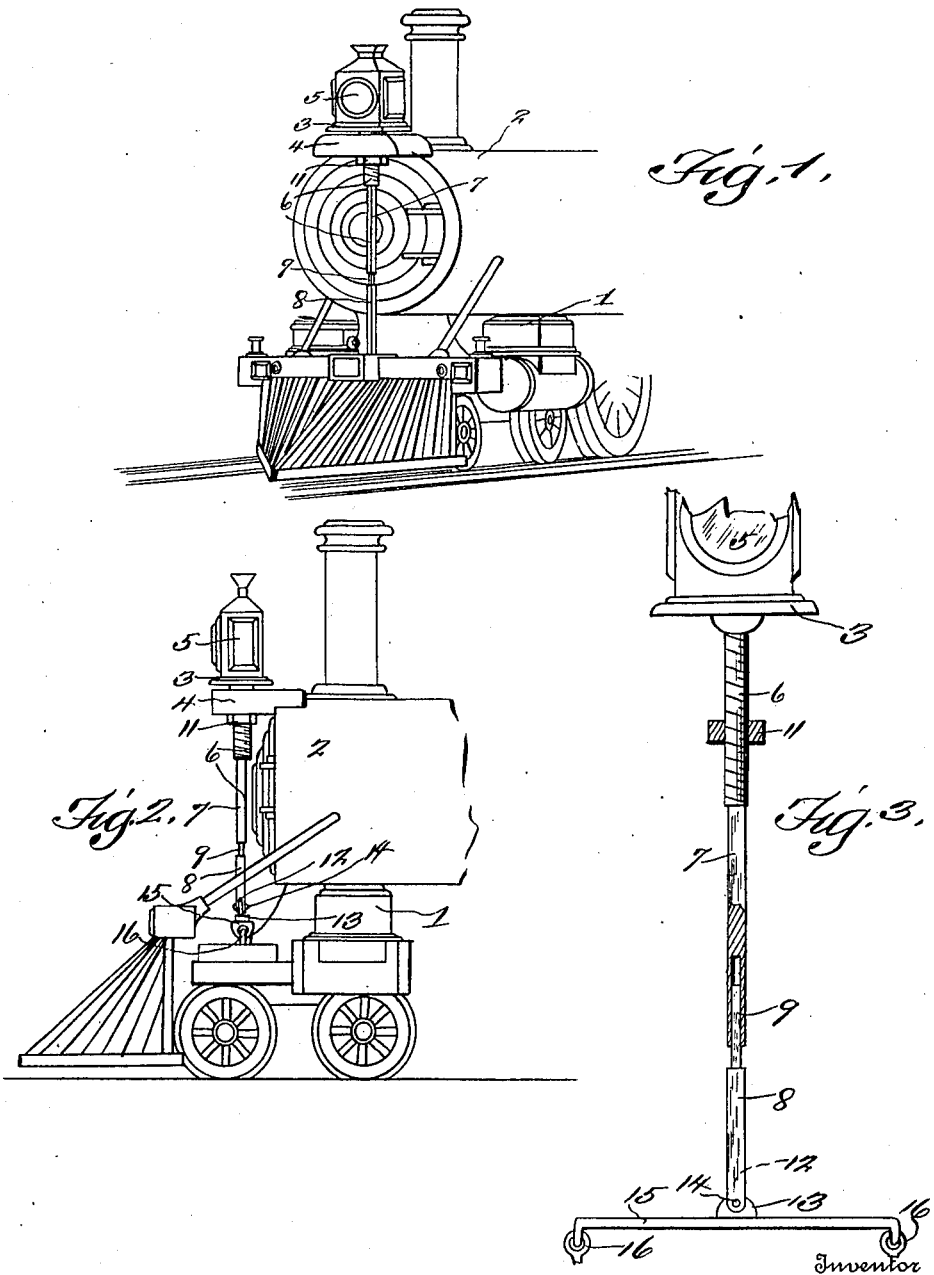

WILLIAM FRANK WALTON, OF SPRINGFIELD, TENNESSEE.

DIRIGIBLE LIGHT FOR LOCOMOTIVES.

1,206,956.  Specification of Letters Patent.  Patented Dec. 5, 1916.

Application filed March 22, 1916. Serial No. 85,890.

*To all whom it may concern:*

Be it known that I, WILLIAM FRANK WALTON, a citizen of the United States, residing at Springfield, in the county of Robertson, State of Tennessee, have invented a new and useful Dirigible Light for Locomotives; and I do hereby declare the following to be a full, clear, and exact description of the invention, such as will enable others skilled in the art to which it appertains to make and use the same.

This invention relates to a new and useful dirigible headlight for locomotives, and an object of the invention is to provide a headlight of this kind adapted to turn with the front truck of the engine, in order to throw the light upon the track when rounding a curve, in lieu of throwing it at a tangent to the track, as when the headlight is fixed.

In practical fields the details of construction may necessitate alterations, falling within the scope of what is claimed.

The invention comprises further features and combination of parts, as hereinafter set forth, shown in the drawings and claimed.

In the drawings: Figure 1 is a view showing the improved headlight and its attendant parts as applied to a locomotive. Fig. 2 is a sectional view, showing more clearly the details of construction. Fig. 3 is a detail view of the stem of the headlight.

Referring more especially to the drawings, 1 designates a locomotive, on the boiler 2 of which the platform 4 is fixed, which supports the base 3 of the headlight 5. Extending downwardly from the base 3 of the headlight is a stem 6 comprising two sections 7 and 8, the adjacent ends of which are rectangular in cross section, one being hollow, to telescopically receive the other, thereby affording telescoping or sliding joint 9, so that the headlight will accommodate itself to vertical vibration of the boiler of the locomotive incident to the front truck. The section 7 is provided with a nut to engage under the platform 4, said nut being designated by the numeral 11. The lower extremity of the section 8 is bifurcated as shown at 12 engaging a lug 13, there being a pivot pin 14, thereby connecting the section 8 to the lug pivotally, whereby the headlight will accommodate itself to the lateral movement. The lug is carried by a supporting bracket, the angle ends of which bracket 15 are connected by eye bolts 16 to the front truck of the locomotive, so that the bracket and the other parts of the device will accommodate themselves to the backward and forward vibration.

The invention having been set forth, what is claimed as new and useful is:

In a dirigible headlight mechanism for locomotives, the combination of a locomotive and a headlight having a base, of a platform fastened to the boiler of the locomotive, a stem projecting downwardly from the base of the headlight and swivelly extending through the platform, a nut on the stem adjacent the under face of the platform, said stem consisting of two sections rectangular in cross section, one of the adjacent ends of the sections having a rectangular socket, the adjacent end of the other section having a rectangular extension for fitting the socket telescopically, the lower end of the last mentioned section being bifurcated, a bracket having a lug pivoted in said bifurcation, whereby the stem may pivot laterally on the lug, said bracket having opposite angular ends provided with eyes, and eye bolts carried by the truck of the locomotive pivoted in the eyes of the angular ends of the bracket, so that the bracket may pivot forwardly and rearwardly.

In testimony whereof I have signed my name to this specification in the presence of two subscribing witnesses.

WILLIAM FRANK WALTON.

Witnesses:
 D. A. PAYNE,
 CLIFFORD COUTS.